(12) United States Patent
Tran et al.

(10) Patent No.: US 7,620,034 B1
(45) Date of Patent: Nov. 17, 2009

(54) SYSTEMS AND METHODS FOR PROVIDING SERVICE MIGRATION BETWEEN FIRST AND SECOND CELLULAR TECHNOLOGIES

(75) Inventors: Nhan Thanh Tran, Lawrenceville, GA (US); Charles Jamile Hamadi, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 302 days.

(21) Appl. No.: 10/910,140

(22) Filed: Aug. 2, 2004

Related U.S. Application Data

(60) Provisional application No. 60/492,082, filed on Aug. 1, 2003, provisional application No. 60/540,995, filed on Feb. 2, 2004.

(51) Int. Cl.
 *H04L 12/66* (2006.01)
 *H04W 4/00* (2006.01)
(52) U.S. Cl. .................................... 370/352; 455/461
(58) Field of Classification Search .............. None
 See application file for complete search history.

(56) References Cited

U.S. PATENT DOCUMENTS

| | | | | |
|---|---|---|---|---|
| 6,240,293 | B1* | 5/2001 | Koster | 455/445 |
| 6,738,633 | B2* | 5/2004 | Kim et al. | 455/461 |
| 2006/0240819 | A1* | 10/2006 | Xu et al. | 455/432.1 |

* cited by examiner

*Primary Examiner*—Hong Cho
*Assistant Examiner*—Eunsook Choi
(74) *Attorney, Agent, or Firm*—Moazzam & Associates, LLC

(57) ABSTRACT

Systems and methods for a call flow for a mobile directory number (MDN) from a first phone to a second phone which has been intra-service ported. The system includes: a first switch of a first technology; a second switch of a second technology; and a local number portability database (LNP). The LNP stores local routing numbers (LRN) associated with the MDN. The WLNP system determines whether a call, from the first phone, is received by a public switched telephone network (PSTN) or the first switch. If the call is received by the PSTN with the LRN, the call is routed to the second switch based on the LRN. If the call is received by the first switch without the LRN, the first switch queries the LNP for the LRN and the call is routed intra-carrier to the second switch.

11 Claims, 12 Drawing Sheets

Both TDMA and GSM calls are handled by TDMA MSC: TDMA Mobile to GSM Mobile (New Customer)

Both TDMA and GSM calls are handled by TDMA MSC: GSM Mobile to TDMA Mobile

Both TDMA and GSM calls are handled by TDMA MSC: GSM Mobile to TDMA Mobile

Both TDMA and GSM calls are handled by TDMA MSC: Land to GSM Mobile (New Customer) & LEC performs LNP DB query Both TDMA and GSM calls are handled by TDMA MSC: Land to GSM Mobile (New Customer) & LEC does not query LNP DB Both TDMA and GSM calls are handled by TDMA MSC: Calls to a roaming GSM Mobile (New and ported from TDMA customer)

GSM MSCs has new Nxx codes and new PSTN circuits: TDMA Mobile to GSM Mobile (New customer)

GSM MSCs has new Nxx codes and new PSTN circuits: TDMA Mobile to GSM Mobile (Ported from TDMA)

GSM MSCs has new Nxx codes and new PSTN circuits: GSM Mobile to GSM Mobile (Ported from TDMA)

Scenario 2.E: GSM MSCs has new Nxx codes and new PSTN circuits: GSM Mobile to GSM Mobile (Ported from TDMA)

GSM MSCs has new Nxx codes and new PSTN circuits: GSM Mobile to TDMA Mobile

Handling of GAIT mobile locked to GSM system and registered in TDMA HLR: TDMA Mobile to GSM GAIT Mobile (homed in TDMA HLR)

Handling of GAIT mobile locked to GSM system and registered in TDMA HLR: GSM Mobile to GSM GAIT Mobile (homed in TDMA HLR)

Handling of GAIT mobile locked to GSM system and registered in TDMA HLR: Land to GSM GAIT Mobile (homed in TDMA HLR)

Scenario 4.A: TANDEM type calls not specific to WLNP, Pooling, and Service Migration: Mobile to Land (Multi-MSC market with trunking to multiple PSTN tandem switches)

TANDEM type calls not specific to WLNP, Pooling, and Service Migration: Mobile to Mobile (Multi-MSC market with trunking to multiple TDMA switches)

TANDEM type calls not specific to WLNP, Pooling, and Service Migration: Mobile to Mobile (Multi-MSC market with trunking to multiple TDMA switches)

SYSTEMS AND METHODS FOR PROVIDING SERVICE MIGRATION BETWEEN FIRST AND SECOND CELLULAR TECHNOLOGIES

RELATED APPLICATIONS

This application is a Non-Provisional Application which claims the benefit of the filing dates of U.S. Provisional Application Ser. Nos. 60/492,082 filed Aug. 1, 2003 and 60/540,995 filed Feb. 2, 2004, both entitled "Systems and Methods for Providing Service Migration Between First and Second Cellular Technologies," the entirety of which is incorporated herein by reference.

BACKGROUND OF THE INVENTION

1. Field of the Invention

The present invention relates in general to migrating subscribers between first and second cellular technologies, and in particular, to using an inter-machine trunk (IMT) to support service migration within a carrier's own systems with wireless local number portability (WLNP) functionality.

2. Description of the Related Art

In the past, a carrier did not own, or operate on, more than one cellular technology, for example, both time division multiple access (TDMA) technology and the global system for mobile communications (GSM) technology. So there was no need to traffic a message from a first technology to a second technology. Service migration is defined as the ability for the carrier to deprovision a subscriber from one technology and provision the subscriber on the second technology while allowing the subscriber to keep their same phone number. Currently, numerous carriers are moving their services from a first technology to a second more advanced cellular technology.

The FCC mandate of WLNP for wireless system has recently been enacted to support subscribers in changing carriers. That is, systems must be put in place that allow for local number portability such that a subscriber can take their mobile directory number (MDN) if they decide to move from one cellular/PCS carrier to a new cellular/PCS carrier.

However, the problem faced by carriers was determining how to support the migration of mobile directory numbers (MDN's) from one technology to a second technology, for example from TDMA to GSM, without requiring the subscriber to obtain a new MDN.

In the past, the solution was to use a form of sequential validation. Conventionally, validation was performed first for one technology, and if the validation yielded a false response, then the validation is redirected to the second technology. This solution provided a form of validation which required the additional use of machine trunks. In addition, this solution also did not take into consideration the use of WLNP functionality.

SUMMARY OF THE INVENTION

According to the systems and methods of this invention, WLNP functionality has been further developed to solve the problems associated with migrating subscribers within a carrier from one technology to another.

The present invention addresses the shortcomings identified above by providing systems and methods for using inter-machine trunks (IMT) to support service migration with WLNP functionality.

An object of this invention is to migrate subscribers from a first technology to a second technology, such as between TDMA and GSM, using the industry porting process defined for supporting number pooling and wireless number portability (WLNP).

Another object of this invention is to implement the use of IMT's to handle certain mobile type calls to support the service migration with WLNP functionality. This arrangement contains many benefits and is cost effective. The use of the inter-machine trunks (IMT) is applicable for various markets. For example, where a global system for mobile communications mobile switching center (GSM MSC) and a time division multiple access mobile switching center (TDMA MSC) are co-located, trouble shooting and maintenance of the GSM MSC and the TDMA MSC is easier and more efficient.

The systems and methods of this invention provide numerous advantages. For example, considerable cost saving can be realized for markets where a GSM MSC and a TDMA MSC reside in the same location, and where direct switch-to-switch connectivity can be established without involvement from the local exchange carrier (LEC). There is also no need for additional facilities to the public switched telephone network (PSTN)/LEC, for example, in those markets where the LEC will not be able to provide facilities due to capacity issues. A single carrier can solely manage call flow capacity between the GSM and TDMA technologies.

One aspect of the invention is to provide a wireless number portability (WLNP) system for migrating a call flow for a mobile directory number (MDN) from a first phone to a second phone which has been intra-service ported. The WLNP system includes a first switch of a first technology; a second switch of a second technology; and a local number portability database (LNP) that stores local routing numbers (LRN) associated with the MDN. The WLNP system determines whether a call, from the first phone to the second phone, is received by a public switched telephone network (PSTN) or the first switch. If the call is received by the PSTN with the LRN, the call is routed based on the LRN to the second switch. If the call is received by the first switch without the LRN, the first switch queries the LNP for the LRN and the call is routed intra-carrier to the second switch.

Another aspect of the invention is to provide a method for migrating a call from a first phone to a second phone where a subscriber's mobile directory number (MDN) has been intra-service ported from a first switch of a first technology to a second switch of a second technology. The method includes creating a profile in a local number portability database (LNP) based on the intra-service ported MDN; determining how the call is received and routing the call accordingly. First, the method determines whether the call is received by a public switched telephone network (PSTN) or the first switch. If the call is received by the PSTN with the LRN, then the call is routed based on the LRN to the second switch. Otherwise, if the call is received by the first switch without the LRN, the LNP is queried for the LRN by the first switch, and the call is routed intra-carrier to the second switch.

In accordance with another aspect of this invention, a wireless number portability (WLNP) system is provided that includes: a first PSTN connection, a first switch of a first technology; and a second switch of a second technology in communication with the PSTN connection, the first switch, and the local number portability database (LNP). The WLNP system migrates a call flow from a first phone to a second phone where a mobile directory number (MDN) has been intra-service ported from the first switch to the second switch. The local number portability database (LNP) stores local routing numbers (LRN) associated with the MDN that has been intra-service ported. The WLNP system determines whether a call, from the first phone is received by the public switched telephone network (PSTN) or the first switch. If the call is received by the PSTN with the LRN from the LNP, the PSTN routes the call based on the LRN to the second switch. If the call is received without the LRN from the LNP, the first switch queries the LNP to obtain the LRN, and then routes the call on an inter-machine trunk (IMT) to the second switch.

The first switch routes the call on an inter-machine trunk (IMT) to the second destination switch of the second technology.

It is yet another aspect according to the method described above, the first technology can be chosen from at least one of TDMA, GSM, CDMA, UMTS, GPRS and PBX.

In accordance with the method described above, the second technology is different from the first technology and can be chosen from at least one of TDMA, GSM, CDMA, UMTS, GPRS and PBX.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Particular embodiments of the present invention will now be described in greater detail with reference to the figures.

Conventionally, carriers generally operated on a single technology network. Accordingly, there was no need to migrate numbers between two technology network systems intra-carrier. However, currently, carriers may operate on more than one technology network. Thus, there is a need to facilitate the migration of a number from a first technology network system to a second technology network system.

Figure 20:
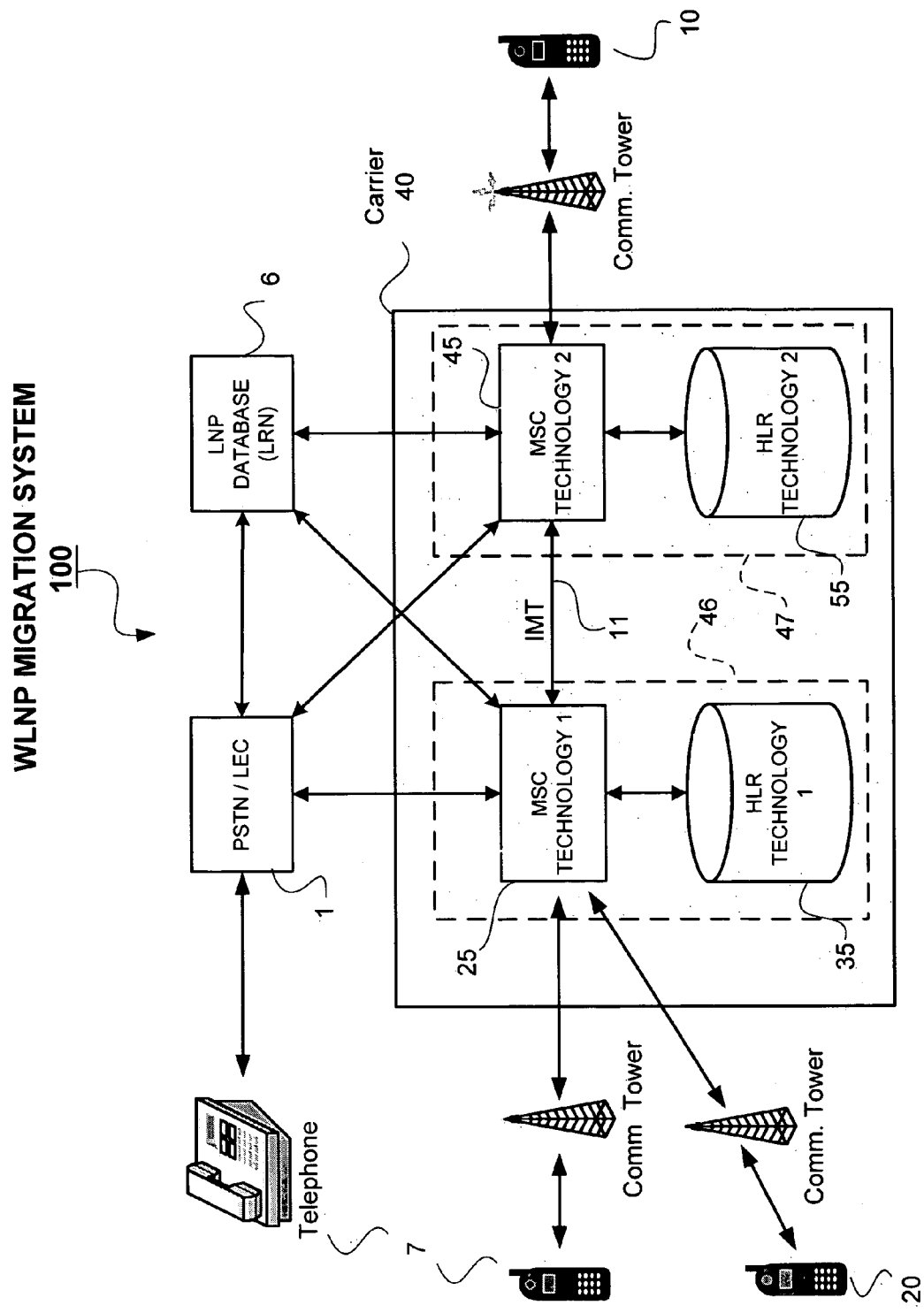
FIG. 20 is a functional block diagram of the WLNP migration system in accordance with systems and methods of this invention.

FIG. 20 is an exemplary illustration of a WLNP migration system 100 that provides migration of subscribers from a first technology network system to a second technology network system intra-carrier in accordance with systems and methods of this invention. In particular, the WLNP migration system 100 routes a call flow placed from an originating phone 7 (for example, by a landline phone or a cellular device) to a destination phone (such as a destination phone 20 subscribing to a first technology network system or a destination phone 10 subscribing to a second technology network system).

FIG. 20 shows a carrier 40 including a first technology network system 46 and a second technology network system 47. The carrier 40 may route the call flow internally through any one, or both, of the two different technology network systems 46, 47, and then out to the destination phone 10, 20 via communication towers.

The first or second technology network systems 46, 47 may be chosen from any suitable technology network system, such as for example, at least one of TDMA, GSM, CDMA, UMTS, GPRS, PBX or any other technology network system now known or later developed. Those skilled in the art will appreciate that the present invention can be implemented in various other wireless and radio frequency data transmission systems, including networks utilizing EDGE, TDMA, FDMA, WCDMA, OFDM, and similar communications protocols.

The WLNP migration system 100 illustrates a public switched telephone network (PSTN) 1, or local exchange carrier (LEC). The PSTN 1 refers to the entire interconnected collection of local, long distance and international phone companies.

The PSTN 1 communicates with the local number portability database (LNP DB) 6, the MSC 25 of the first technology network system within the carrier, and the MSC 45 of the second technology network system within the carrier.

The LNP DB 6 communicates and exchanges information with the PSTN/LEC 1, the MSC 25 and the MSC 45. The LNP DB 6 is a database that keeps track of subscriber profile information, such as network addresses for each mobile directory number (MDN), whether an MDN has been ported from one location to another location (such as from a first technology network system first technology network system 46 to a second technology network system 47), or to another carrier or operator.

The first technology network system 46 may include an MSC 25 and an HLR 35. The second technology network system 47 may also include an MSC 45 and an HLR 55. The MSC 25 of the first technology network system 46 may be connected to the MSC 45 of the second technology network system 47 via an inter-machine trunk (IMT) 11.

The inter-machine trunk (IMT) 11 is a communication line provided between the MSC 25 of the first technology network system first technology network system 46, and the MSC 45 of the second technology network system 47. The IMT 11 includes data translation which allows for the translation of data back and forth between the MSC 25 of the first technology network system 46 and the MSC 45 of the second technology network system 47 so that the WLNP migration system 100 can support both technologies.

In operation, the following process occurs in accordance with systems and methods of this invention. When an incoming call from an originating phone 7 is received for a designation phone 10, 20, either, the PSTN/LEC 1, or the MSC 25 of the first technology network system 46 may receive the call flow.

If the PSTN 1 receives the incoming call, the PSTN 1 may query the LNP DB 6 to determine whether the call (or MDN) is to be routed to the destination phone (20) belongs to the first technology network system 46, or whether the call is to be routed to the destination phone (10) which has been ported to the second technology network system 47.

Conventionally, the PSTN 1 always routed the call by default to the MSC 25 of a first technology network system 46. However, according to systems and methods of this invention, the PSTN 1 may query the LNP DB 6 (prior to routing the call to the MSC 25 of the first technology network system) to determine whether the destination phone 20 belongs to the first technology system 46, or whether the destination phone 10 has been ported to the second technology network system 47. In response to the query of the LNP DB 6, the PSTN 1 may directly route the call to the MSC 45 of the second technology network system 47, bypassing the MSC 25 of the first technology network system 46.

When the call is automatically routed to the MSC 25 of the first technology network system 46, the MSC 25 queries the LNP DB 6 to determine whether the destination phone has been ported (such as destination phone 10) to the second technology network system 47. If the destination phone has not been ported (such as destination phone 20) from the first technology network system 46, a return result from the LNP DB 6 informs the MSC 25 that the HLR 35 of the first technology network system 46 serves the destination phone 20. The HLR 35 of the first technology network system 46 is then queried to verify and to retrieve the subscriber's record. If the record is located by the HLR 35, the return record will return the appropriate routing information to the MSC 35 to terminate or complete the call to the subscriber of the first technology network system 46. When the call terminates, the telephony route is completed and an air interface connection is established. Alternatively, if the record is not located by the HLR 35, a call treatment may be performed on the call and reported to the originating phone 7.

If however, the HLR 35 of the first technology network system 46 cannot verify and/or locate the subscriber's record, the HLR 35 will return a record instructing the MSC 25 to route the call to the MSC 45 of the second technology network system 47. The MSC 25 of the first technology network system 46 will route the call to the MSC 45 of the second technology network system 47 via the inter-machine trunk (IMT) 11.

When the call is received by the MSC 45 of the second technology network system 47, the MSC 45 queries the HLR 55 of the second technology network system 47 to verify and retrieve the subscriber's record. The HLR 55 performs functions similar to the HLR 35, such as for example, determining which account is associated with the MDN and/or whether the MDN is an active MDN. If the record is located by the HLR 55, a return record may be returned including appropriate routing information to the MSC 45 to terminate or complete the call to the subscriber of the second technology network system 47.

If however, the HLR 55 cannot verify and/or locate the subscriber's record, the HLR 55 will return a record instructing the MSC 45 to give the call an error call treatment informing the origination phone 7 that the call cannot be placed. Various reasons may cause an error treatment including, but limited to, there being no record of an account associated with the MDN, the MDN may not be active, or the like. The call treatment, can include, but is not limited to providing a wrong number message, a message that this number is not in service, and or any other message notifying the caller that the call cannot be completed.

The originating call can be originated from various devices, including a landline phone, cell phone, a facsimile, the Internet, or any other communication device now known or later developed that is capable of placing a call.

According to systems and methods of this invention, the destination phone 10, 20 can also be chosen from any one of various phones from various technologies, including but not limited to, a GSM mobile phone, a TDMA phone, or any other device now known or later developed phone that is capable of receiving a call.

As mentioned before, this invention overcomes the conventional problems described above by providing a wireless local number portability (WLNP) migration system that provides for the migration of subscribers from a first technology to a second technology within a carrier, for example, from TDMA to GSM, using the industry porting process defined for supporting number pooling and wireless number portability (WLNP). That is, a subscriber who migrates from, for example, TDMA to GSM is able to keep their mobile directory number (MDN).

A subscriber profile in a local number portability database (LNP DB) is created. The entry is added into the LNP DB that applies an LRN of a GSM MSC switch to the MDN.

Figure 1:
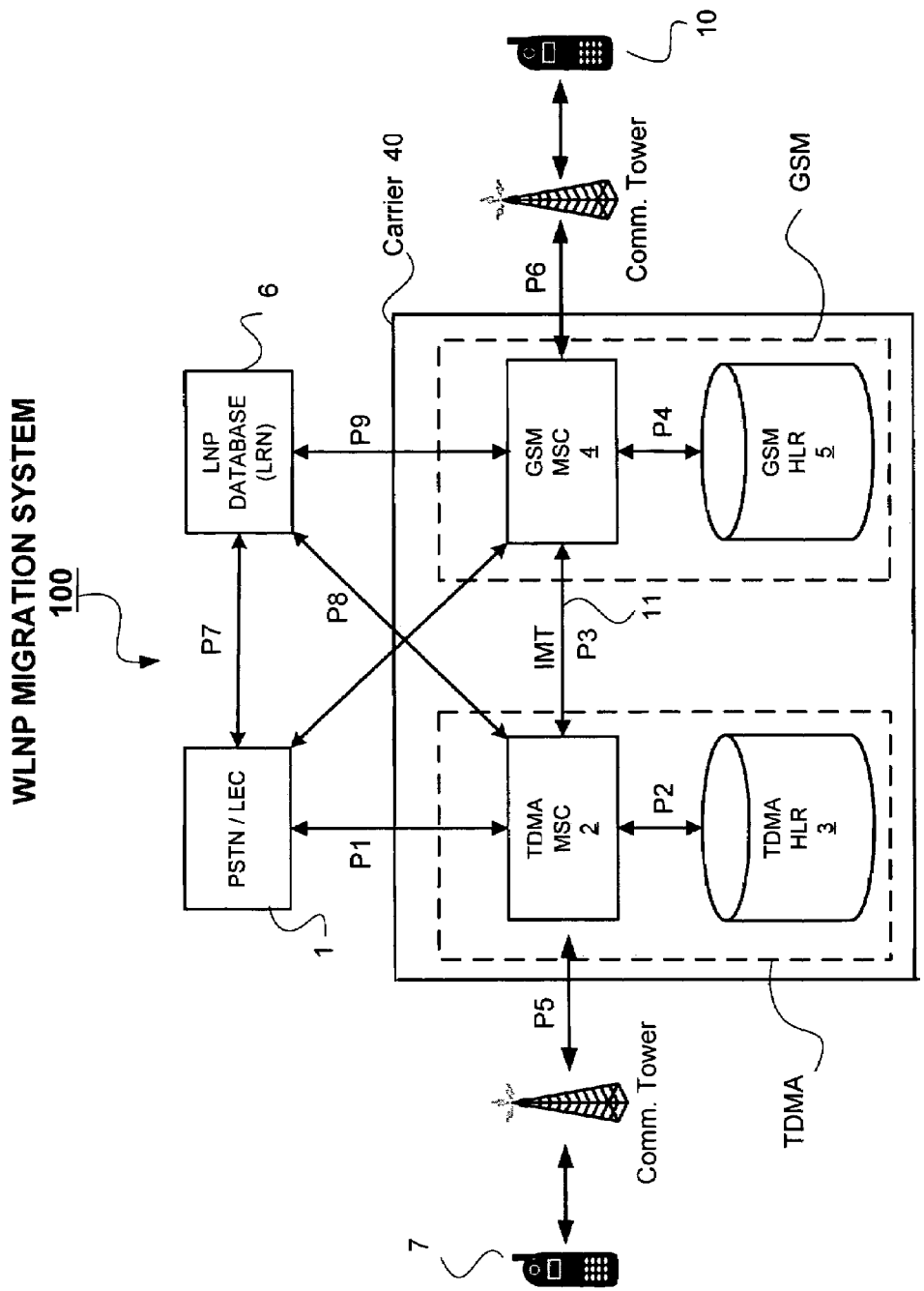
FIG. 1 is a functional block diagram of a WLNP migration system in accordance with systems and methods of this invention.

FIG. 1 is a more detailed exemplary illustration of a WLNP migration system 100.

The PSTN 1 is connected along a path P1 to a time division multiple access mobile switching center (TDMA MSC) 2. The TDMA MSC 2 is a telecommunication switch or exchange within a cellular network architecture which is capable of inter-working with location databases. The TDMA MSC 2 exchanges information along path P2 with a time division multiple access home location register (TDMA HLR) 3.

The TDMA HLR 3 is a database that provides routing information for mobile terminated calls and short message service. The TDMA HLR 3 is also responsible for the maintenance of TDMA user subscription information. This information is distributed to a relevant visitor location register (VLR, not shown).

Although shown as a TDMA MSC 2 with a TDMA HLR 3, the TDMA MSC 2 and TDMA HLR 3 can be any type of switching device of a first technology that is capable of routing a call, such as TDMA, GSM, CDMA, UMTS, GPRS, PBX, and any other known or later developed technology capable of routing a call.

The TDMA MSC 2 is shown connected to a general system for mobile communications mobile switching center (GSM MSC) 4 via an inter-machine trunk (IMT) along path P3. The GSM MSC 4 is also a telecommunication switch or exchange within a cellular network architecture which is capable of inter-working with location databases. The GSM MSC 4 exchanges information along path P4 with a general system for mobile communications home location register (GSM HLR) 5.

The GSM HLR 5 is also a database that provides routing information for mobile terminated calls and short message service. The GSM HLR 5 is responsible for the maintenance of GSM user subscription information. This information is distributed to a relevant visitor location register (VLR, not shown).

Although shown as a GSM MSC 4 with a GSM HLR 5, the GSM MSC 4 and the GSM HLR 5 can be any type of switching device of a second technology that is capable of routing a call, such as TDMA, GSM, CDMA, UMTS, GPRS, PBX, and any other known or later developed technology capable of routing a call.

A local number portability database (LNP DB) 6 communicates and exchanges information with the PSTN 1, the TDMA MSC 2 and the GSM MSC 4 via paths P7, P8 and P9 respectively. The LNP DB 6 is the facility whereby subscribers may retain their telephone number when moving to another location or to another carrier or operator. For purposes of this invention, the LNP DB 6 also contains the designation of the switch being a TDMA or a GSM switch. Each phone number has a network address, and the LNP DB 6 keeps track of these addresses. When a customer places a call, the LNP DB 6 is queried. The LNP DB 6 records the caller's network address, locates the dialed number's network address, and notifies all telecommunications companies involved where to route the call via a local routing number (LRN) and which companies to credit for the call. The LRN is a 10-digit telephone number. The LNP DB 6 system also records the appropriate information whenever a customer changes local carriers, such as whether the phone number has been ported (for example, wireless to wire-line porting, and vica-versa). The LNP DB 6 updates account information and ensures that no interruption of service occurs.

The inter-machine trunk (IMT) 11 is provided between the TDMA MSC 2 and the GSM MSC 4. The IMT 11 is a circuit 6 built between the TDMA MSC 2 in the TDMA network and the GSM MSC 4 in the GSM network. In the IMT 11, data translation is built into the MSC's to route the call from the TDMA MSC 2 to the GSM MSC 4.

According to this exemplary embodiment, the IMT 11 translates ANSI 41 which is the signaling language associated with the TDMA network, and also translates GSM MAPP which is the signaling language associated with the GSM network. The IMT 11 allows translation back and forth between the TDMA MSC 2 and the GSM MSC 4 so that the WLNP migration system 100 can support both technologies. Translation may occur according to various now known or later developed methods.

FIG. 1 shows one exemplary embodiment in which a subscriber desires to migrate from TDMA to GSM while keeping the same MDN in accordance with systems and methods of this invention.

According to this embodiment, it is understood that a TDMA subscriber has migrated his mobile directory number (MDN) from a TDMA phone network to a GSM phone network. An entry is added into the LNP DB 6 that applies the LRN of the GSM MSC 4 to the MDN.

When an incoming call, for example, from originating phone 7 is received for the designation phone 10, either the PSTN 1 or the TDMA MSC 2 queries the LNP DB 6. If the call is first routed to the PSTN 1, the PSTN 1 may query the LNP DB 6 for the applicable LRN. If the LRN for GSM is designated by the return LRN from the LNP DB 6, then, the call will LRN route directly to the home GSM MSC 4.

If the PSTN 1 simply routes the call to the TDMA MSC 2 marked unqueried, then the TDMA MSC 2 will query the LNP DB 6 and LRN route the call to the home GSM MSC 4.

Although the call is shown as being originally received at the TDMA MSC 2, the originating phone 7 call may be originally received from various devices, including the PSTN 1, the GSM MSC 4, or any other switching device now known or later developed that is capable of routing a call.

Figure 2:
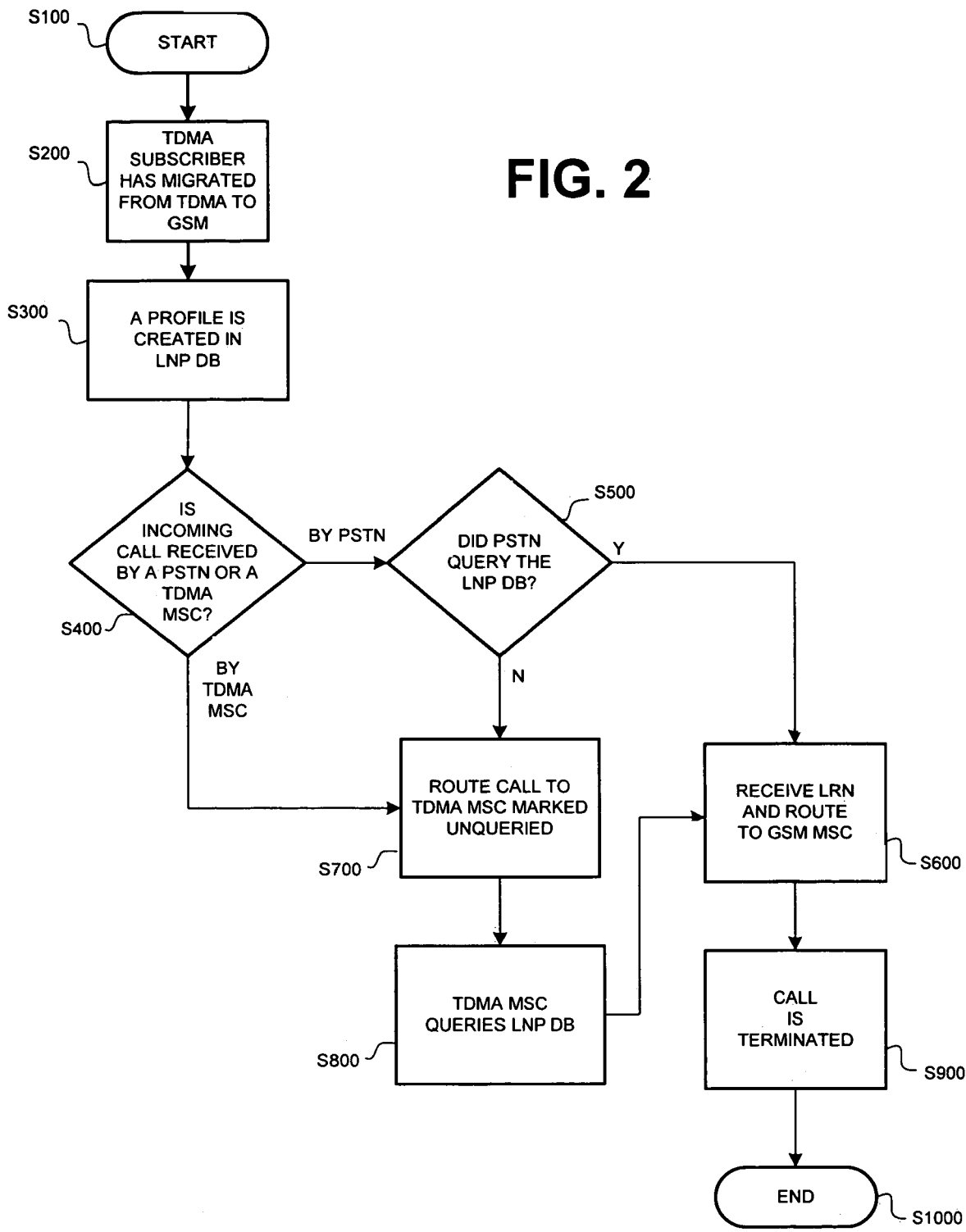
FIG. 2 shows an exemplary method for migrating a call flow from an originator phone to a destination phone subscriber between a first technology and a second technology via a wireless local number portability (WLNP) migration system.

FIG. 2 shows an exemplary method for migrating a call flow from an originator phone to a destination phone subscriber between a first technology and a second technology via a wireless local number portability (WLNP) migration system.

In step S100, a control routine begins. The control routine proceeds to step S200.

In step S200, a TDMA subscriber has migrated his mobile directory number (MDN) from a TDMA phone network to a GSM phone network. The control routine proceeds to step S300.

In step S300, a profile in a local number portability database (LNP DB) is created as a result of the migration. In particular, an entry is added into the LNP DB that applies a local routing number (LRN) of a global system for mobile communications mobile switching center (GSM MSC) to the mobile directory number (MDN). The control routine proceeds to step S400.

In step S400, the routine determines whether an incoming call, from an originator phone intended for a destination phone, is received by a public switched telephone network (PSTN) or a time division multiple access mobile switching center (TDMA MSC). If the incoming call is received by the PSTN, the control routine proceeds to step S500, otherwise the routine continues to step S700.

In step S500, the routine determines if the PSTN has queried the LNP DB for an LRN. If the PSTN has queried the LNP DB for an LRN, the routine continues to step S600, otherwise the routine continues to step S700.

In step S600, the LRN is received by the PSTN and the PSTN routes the call via the LRN to the GSM MSC.

In step S700, either the PSTN has not queried the LNP DB (step S500), or the incoming call from the originator or phone (step S400) is received by the TDMA MSC. The call is then routed to the TDMA MSC and marked as unqueried. The routine proceeds to step S800.

In step S800, the TDMA MSC queries the LNP DB. The routine then proceeds to step S600.

In step S600, the LRN is received by the TDMA MSC and the TDMA MSC routes the call via the LRN on an inter-machine trunk (IMT) to the GSM MSC. The call then proceeds to step S900.

In step S900, the call is terminated, and thus connected between the original phone caller and the destination phone caller for voice communication.

The routine then proceeds to step S1000, where the routine ends.

Various other exemplary scenarios are possible for managing a call flow between the GSM and TDMA technologies in accordance with systems and methods of this invention. By way of example, various exemplary scenarios are described below and shown in the attached figures.

Exemplary Scenario 1

Both TDMA and GSM calls are all handled by the TDMA MSC. According to this scenario, various markets are unable to obtain new number ranges and landline facilities. For purposes of these examples, the following assumptions are made.

1) The GSM system is operating commercially. The GSM system contains both an MSC and an HLR.

2) A designated LRN is provided from a selected existing TDMA 10,000 (10K) number block to support intra-service pooling. The LRN can be used to identify whether the call is intended for GSM or TDMA.

3) Inbound calls intended for TDMA and GSM from the PSTN are directed to the TDMA switch.

4) Inter-machine trunk (IMT) connectivity is provided between the TDMA MSC and the GSM MSC supports signaling system 7 (SS7) functionality.

5) Wireless local number portability (WLNP) capabilities are supported by both the TDMA MSC and the GSM MSC. Connectivity to a local number portability database (LNP DB) of the subscriber's carrier has been established or is supported at least by local number portability database phase 1 (LNP PH1).

6) Both the TDMA MSC and the GSM MSC can support the routing of calls between the respective MSC's using translations of the local routing number (LRN) and/or the temporary local directory numbers (TLDN's).

7) All GSM calls to a landline will be inter-machine trunked (IMT) to the TDMA MSC from the GSM MSC.

8) All the MDN's are type 2 numbers. That is, the carrier owns the whole 10K block of numbers, and the circuits provided are SS7 signaling base capable.

These assumptions are not intended to limit the exemplary scenarios, but are merely provided as exemplary assumptions. Other similar assumptions can also be provided which are capable of similar operation in accordance with systems and methods of this invention.

Mobile to Mobile

All Carrier Codes are Opened for Porting/Pooling

In accordance with scenario 1, a mobile to mobile call is made. The mobile phones can be a TDMA or a GSM mobile phone. The following exemplary scenarios may arise:

A. TDMA Mobile to TDMA Mobile

A TDMA mobile to TDMA mobile call is made according to this scenario. As such, an inter-machine trunk (IMT) is not required.

B. TDMA Mobile to GSM Mobile (New Customer)

Figure 3:
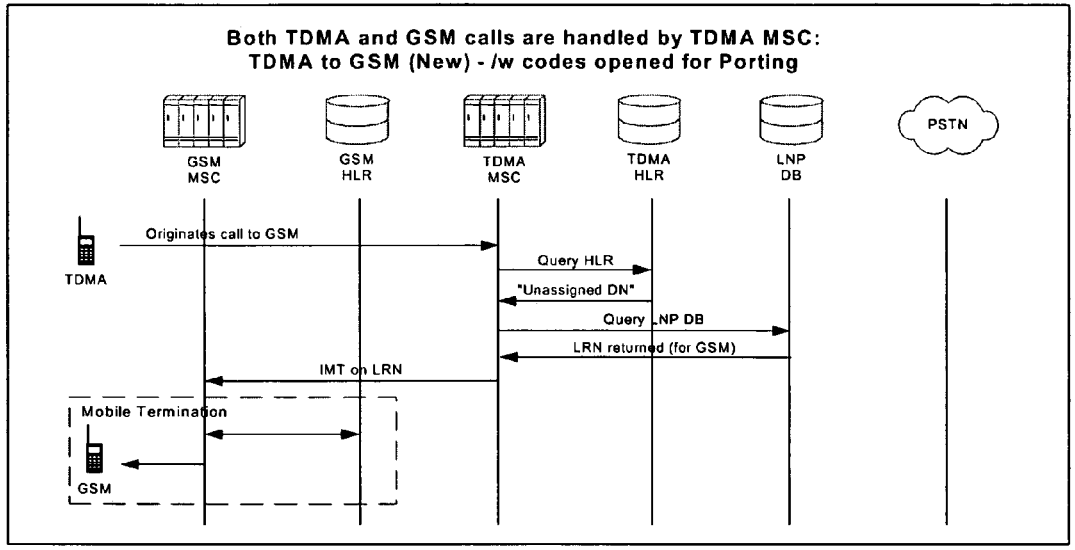
FIG. 3 shows a call being placed from a TDMA mobile to a GSM mobile (new customer).

As shown in FIG. 3, a call is placed from a TDMA mobile to a GSM mobile. The GSM mobile belongs to a new customer. The call to the GSM mobile is originated and received by the TDMA MSC. The TDMA MSC queries the TDMA HLR. If the TDMA HLR return results is negative, for example, either "MIN/HLR Mismatch" or "Unassigned DN", then the TDMA MSC launches an LNP DB query. If the LRN for a GSM subscriber is returned, the TDMA MSC routes the call to the GSM MSC via an IMT based on the LRN (identified as the GSM subscriber).

C. TDMA Mobile to GSM Mobile (Ported from TDMA)

A call is placed from a TDMA mobile to a GSM mobile according to this scenario. However, in this scenario, the GSM mobile number was ported from a TDMA mobile number. That is, the GSM mobile initially had a TDMA mobile phone with TDMA technology and the subscriber has recently purchased a GSM mobile that operates on GSM technology. This method in which this call flow proceeds is similar to the call flow described above under section 1B, entitled "TDMA Mobile to GSM Mobile (New Customer)".

D. GSM Mobile to GSM Mobile (New Customer)

A GSM mobile to a GSM mobile call is made according to this scenario. The GSM mobile belongs to a new customer. According to this scenario, the IMT is not required. That is, the call first queries the GSM HLR. If the GSM HLR returns a negative result, for example, either "MIN/HLR Mismatch" or "Unassigned DN", then the GSM MSC launches an LNP DB query, otherwise the mobile is terminated if the subscriber record is found in the GSM HLR and the call is connected.

E. GSM Mobile to GSM Mobile (Ported from TDMA)

A GSM mobile to a GSM mobile call is made. The GSM mobile being called was ported from a TDMA mobile. According to this scenario, the call does not require the use of an IMT. This method in which this call flow proceeds is similar to the call flow described above under scenario 1A, entitled "TDMA Mobile to TDMA Mobile."

F. GSM Mobile to TDMA Mobile

Figure 4:
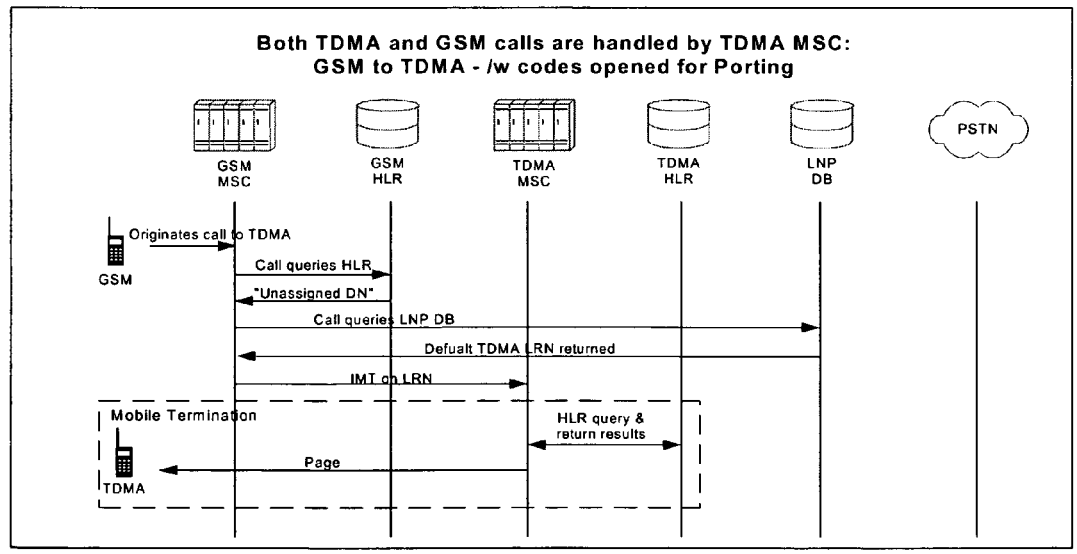
FIG. 4 illustrates a call being placed from a GSM mobile to a TDMA mobile.
Figure 5:
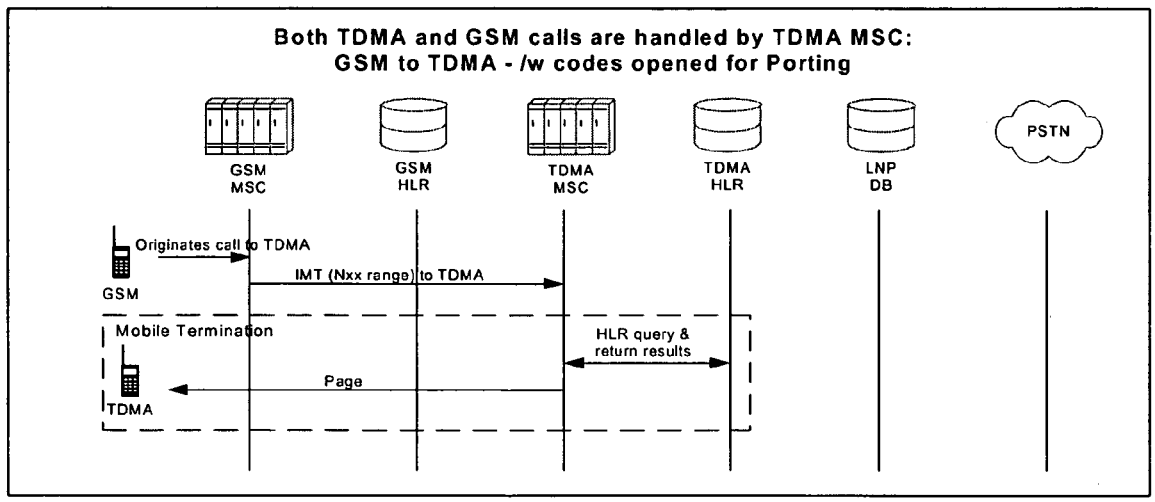
FIG. 5 illustrates another exemplary embodiment of a call being placed from the GSM mobile to a TDMA mobile.

A GSM mobile to a TDMA mobile call is made.

a) As shown in FIG. 4, the call is originated to a TDMA phone. The call queries the GSM HLR first. If the return result from the GSM HLR is negative, for example, either "MIN/HLR Mismatch" or "Unassigned DN", then the GSM MSC launches an LNP DB query. If the LRN (identified as a TDMA subscriber) is returned from the LNP DB, the GSM MSC will route the call via the IMT based on the LRN (identified as a TDMA subscriber).

b) Alternatively, FIG. 5 shows that the call originating from the GSM system can be routed to the TDMA MSC through an IMT, and the TDMA MSC will attempt regular mobile termination. A query is not made to the GSM HLR because the GSM MSC can distinctively determine where to route the call, that is, back to the TDMA MSC.

Land to Mobile

All Carrier Codes Opened for Porting/Pooling and LEC Performs Query

G. Land to TDMA Mobile

This is the typical call scenario. A call is made from a land line phone to a TDMA mobile. An IMT is not required. The call is queried by a LEC. The LEC receives an LRN and routes the call based on the LRN. If the LRN is intended for the TDMA MSC, the LEC will route the call to the TDMA MSC. The TDMA MSC analyzes the LRN to determine if the LRN is identified as its own (i.e., the LRN is designated for the TDMA MSC). The TDMA MSC then launches a query to the HLR to attempt mobile termination; and/or to determine if the LRN is an LRN designated for the GSM MSC. Then, the call is routed to the GSM MSC.

H. Land to GSM Mobile (New Customer)

Figure 6:
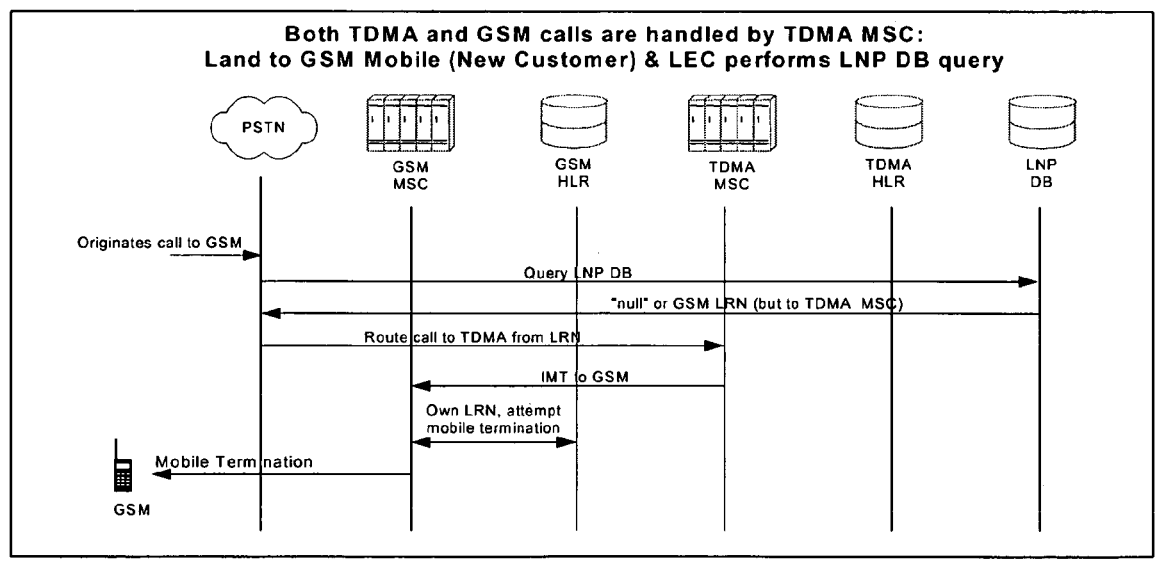
FIG. 6 shows a call being made from a land line phone to a GSM mobile (new customer).

FIG. 6 shows a call being made from a land line phone to a GSM mobile. The GSM mobile is a new customer. The call is queried by the local exchange carrier (LEC). The LEC receives the local routing number (LRN) and routes the call on the LRN (call is still directed to the TDMA switch, but is for a GSM subscriber). The TDMA MSC performs analysis of the LRN that is intended for the GSM subscriber. The TDMA MSC routes the call to the GSM MSC via the IMT.

The GSM MSC performs analysis of the LRN to determine if the LRN is an LRN designated for the GSM MSC and attempts mobile termination.

I. Land to GSM Mobile (Ported from TDMA)

A call is made from a land line phone to a GSM mobile. According to this exemplary scenario, the GSM subscriber was ported from TDMA. Similar to "Land to GSM Mobile (New Customer)" as described under 1H.

Land to Mobile

All Carrier Codes Opened for Porting/Pooling and LEC does not Perform Query

J. Land to TDMA Mobile

A call is made from a land line phone to a TDMA mobile. An IMT is not required. The call comes into the TDMA MSC without a forward call indicator (FCI) bit set. The FCI bit set is an indicator in SS7 signaling that tells the switch that a call has already been queried. The call is routed to query the TDMA HLR first. If the return result from the TDMA HLR is either "MIN/HLR Mismatch" or "Unassigned DN", then the TDMA MSC launches an LNP DB query, otherwise, the mobile is terminated if the subscriber's record is found in the TDMA HLR.

K. Land to GSM Mobile (New Customer)

Figure 7:
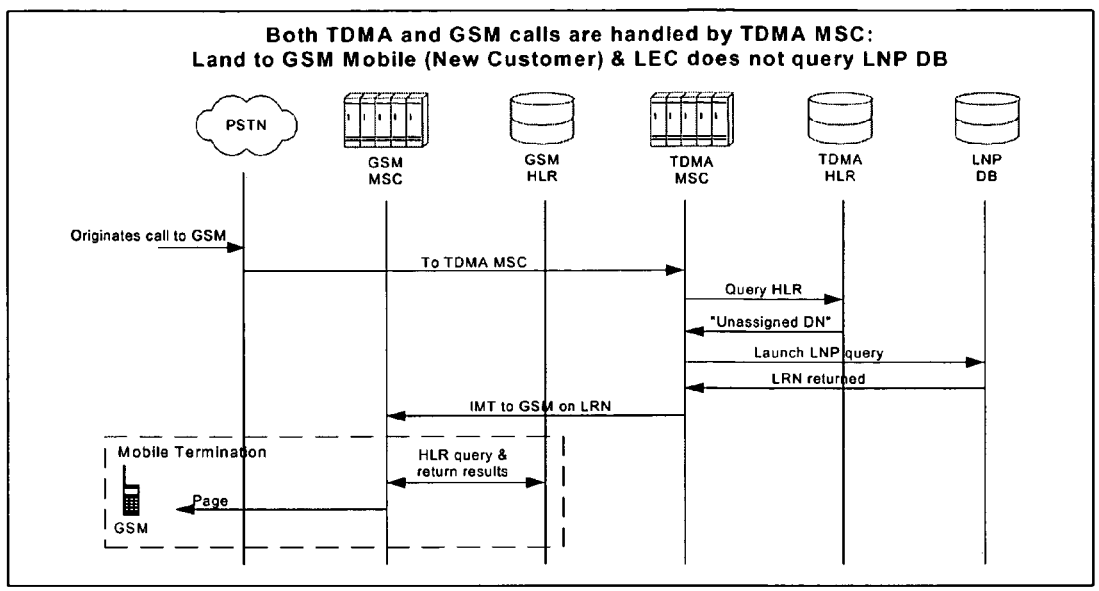
FIG. 7 shows a call being made from a land line phone to a GSM mobile (new customer).

FIG. 7 shows a call being made from a land line phone to a GSM mobile. The call comes into the TDMA MSC without an FCI bit set. The call is routed to query the TDMA HLR first. If the return results from the TDMA HLR is negative, such as either "MIN/HLR Mismatch" or "Unassigned DN", then the TDMA MSC launches an LNP DB query. The TDMA MSC receives the LRN. If the LRN is identified as a GSM subscriber base, then the TDMA routes the call to GSM MSC via IMT. The GSM MSC receives the call and performs analysis of the LRN to determine if the LRN is designated as a TDMA LRN or a GSM LRN and attempts mobile termination.

L. Land to GSM Mobile (Ported from TDMA)

A call is made from a land line phone to a GSM mobile. According to this exemplary scenario, the GSM subscriber was ported from TDMA. The process for routing the call is similar to the "Land to GSM Mobile (New Customer)" as described above under scenario 1K.

Roaming

According to exemplary systems and methods of this invention, the following exemplary scenarios take place when the mobile phone is roaming.

M. TDMA to a Roaming GSM Mobile (New Customer)

Figure 8:
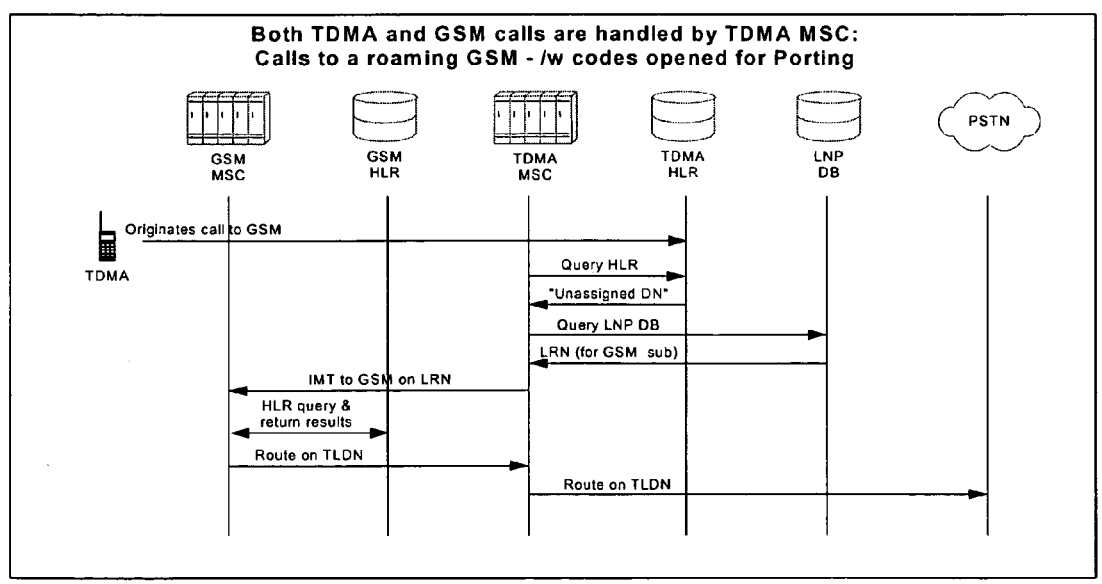
FIG. 8 shows a call being made from a TDMA mobile to a roaming GSM mobile (new customer).

FIG. 8 shows a call being made from a TDMA mobile to a roaming GSM mobile. The GSM mobile is a new customer. The call flow process is similar to the call flow scenario for the "TDMA to GSM Mobile (New customer)" as described above under 1B. The GSM MSC routes the temporary local directory number TLDN received on the GSM HLR query to the TDMA MSC.

N. TDMA to a Roaming GSM Mobile (Ported from TDMA)

A call is made from a TDMA mobile to a roaming GSM mobile. The GSM mobile subscriber has been ported from TDMA. The call flow for this exemplary scenario is similar to call flow scenario for the "TDMA to GSM Mobile (New customer)" as described above under 1B. The GSM MSC routes the TLDN received on the GSM HLR query to the TDMA MSC.

O. GSM to a Roaming GSM Mobile (New Customer)

A call is made from a GSM mobile to a roaming GSM mobile. The GSM mobile is a new customer. The call flow for this exemplary scenario is similar to call flow scenario for the "GSM to GSM Mobile (New customer)" as described above under 1D. The GSM MSC routes the TLDN received on the GSM HLR query to the TDMA MSC.

P. GSM to a Roaming GSM Mobile (Ported from TDMA)

A call is made from a GSM mobile to a roaming GSM mobile. The GSM mobile subscriber has been ported from TDMA. The call flow for this exemplary scenario is similar to call flow scenario for the "GSM to GSM Mobile (New customer)" as described above under 1E. The GSM MSC routes the TLDN received on the GSM HLR query to the MSC.

Exemplary Scenario 2

According to systems and methods of this invention, the GSM MSC's have new Nxx codes and new PSTN circuits. For purposes of these examples, the following assumptions are made.

1) The GSM system is operating commercially. The GSM system contains both a GSM MSC and a GSM HLR.

2) Both the TDMA and the GSM MSC will have their own designated LRN(s).

3) The GSM MSC has new NPA-Nxx(s) number block and the PSTN routes calls to the NPA-Nxx(s).

4) The IMT connectivity between the TDMA and the GSM MSC supports signaling system 7 (SS7).

5) The GSM and the TDMA technologies have their own designated HLR's.

6) WLNP capabilities is supported by both the TDMA and the GSM MSC. Connectivity to the carrier's LNP DB have been established or support at least the LNP PH1.

7) Both the GSM MSC and the TDMA MSC can support the routing of calls between the MSC's using translations of the LRN and/or the TLDN's.

8) All the MDN's are type 2 numbers. That is, the carrier owns the whole 10K block of numbers, and the circuits provided are SS7 signaling base capable.

These assumptions are not intended to limit the exemplary scenarios, but are merely provided as exemplary assumptions. Other similar assumptions can also be provided which are capable of similar operation in accordance with systems and methods of this invention.

Mobile to Mobile

All Carrier Codes Opened for Porting/Pooling

A. TDMA Mobile to TDMA Mobile

A call is made from a TDMA mobile to a TDMA mobile. An IMT not required.

B. TDMA Mobile to GSM Mobile (New Customer)

Figure 9:
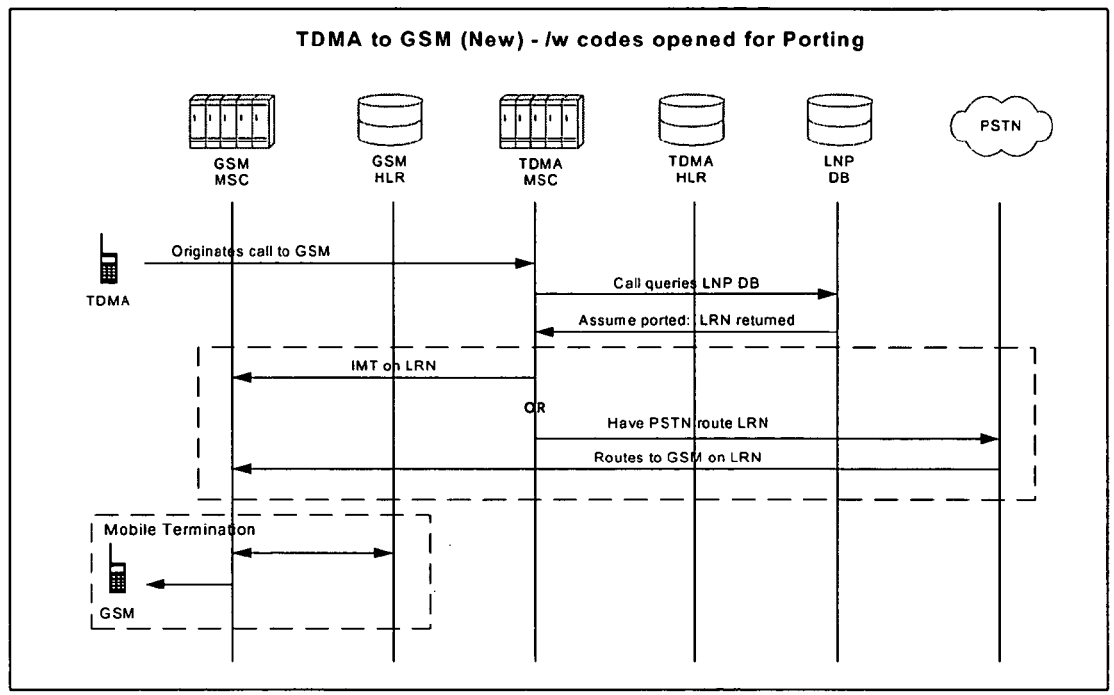
FIG. 9 shows a call being made from a TDMA mobile to a GSM mobile (new customer).

FIG. 9 shows a call being made from a TDMA mobile to a GSM mobile. The GSM mobile subscriber is a new customer. The call is sent from the TDMA MSC to query the LNP DB since the Nxx for the GSM MSC can be considered as a new PSTN Nxx range; if the LRN is returned, TDMA MSC can route the calls to the PSTN or IMT based on the LRN. If the LNP DB query is not done, the call can be routed directly to the GSM MSC via IMT or PSTN based on the Nxx(-x) number block.

C. TDMA Mobile to GSM Mobile (Ported from TDMA)

Figure 10:
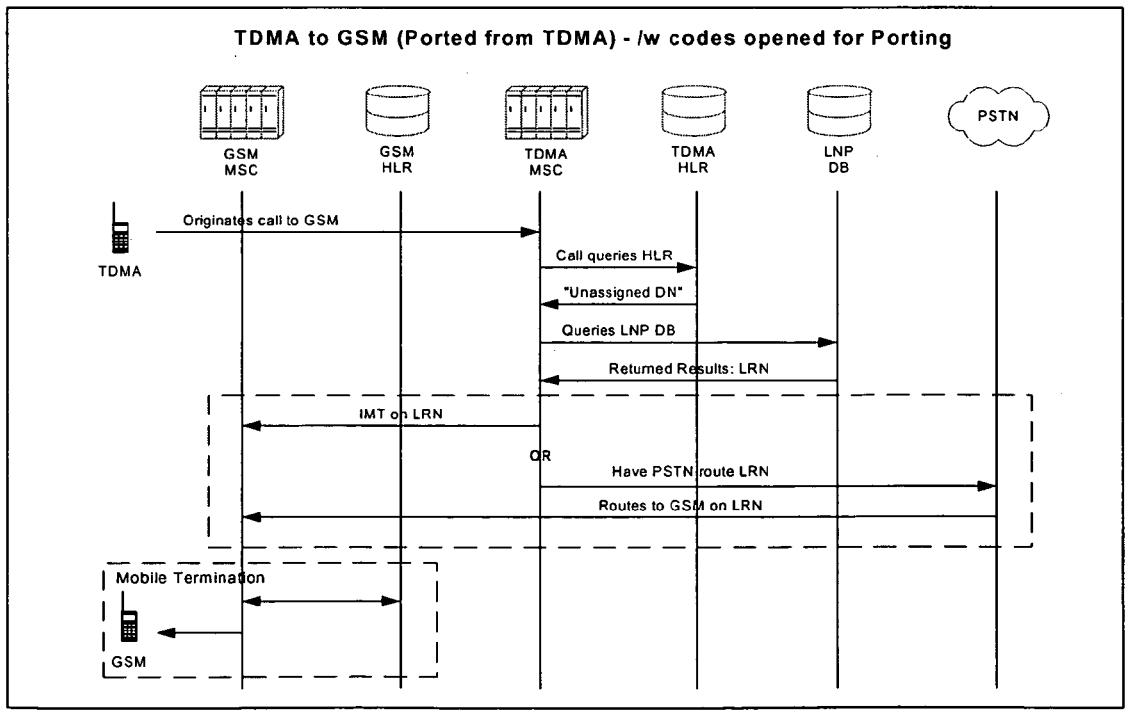
FIG. 10 shows a call being made from a TDMA mobile to a GSM mobile (ported from TDMA).

FIG. 10 shows a call being made from a TDMA mobile to a GSM mobile. The GSM mobile subscriber has been ported from TDMA. The call would be directed to query the TDMA HLR first. Assuming the porting process transferred the subscription records from the TDMA HLR to the GSM HLR successfully, the return results from the TDMA HLR would be "unassigned MDN". This triggers the TDMA MSC to launch an LNP query on the called number. The LNP DB return the query with the GSM LRN. The TDMA MSC can route the call to the GSM switch either through the IMT or to the PSTN.

D. GSM Mobile to GSM Mobile (New Customer)

A call is made from a GSM mobile to a GSM mobile. The GSM mobile is a new subscriber. Use of an IMT is not required.

E. GSM Mobile to GSM Mobile (Ported from TDMA)

A call is made from a GSM mobile to a GSM mobile. The terminating GSM mobile subscriber has been ported from TDMA. The call can be directed towards the LNP DB or to the TDMA MSC via IMT on the Nxx(-x).

Figure 11:
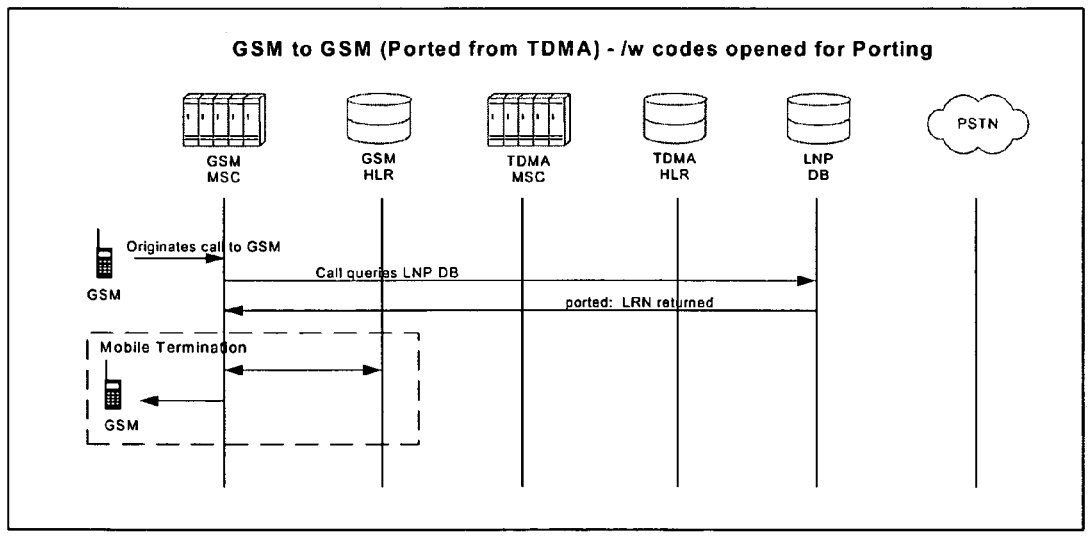
FIG. 11 shows a call being made from a GSM Mobile to a GSM Mobile (Ported from TDMA) and directed to the LNP DB.

(a) FIG. 11 shows that if the call is directed to the LNP DB, then the LNP DB would return the GSM MSC LRN. GSM MSC translates the LRN and identifies it as its own. GSM MSC attempt mobile termination. Note that the call case does not require IMT.

Figure 12:
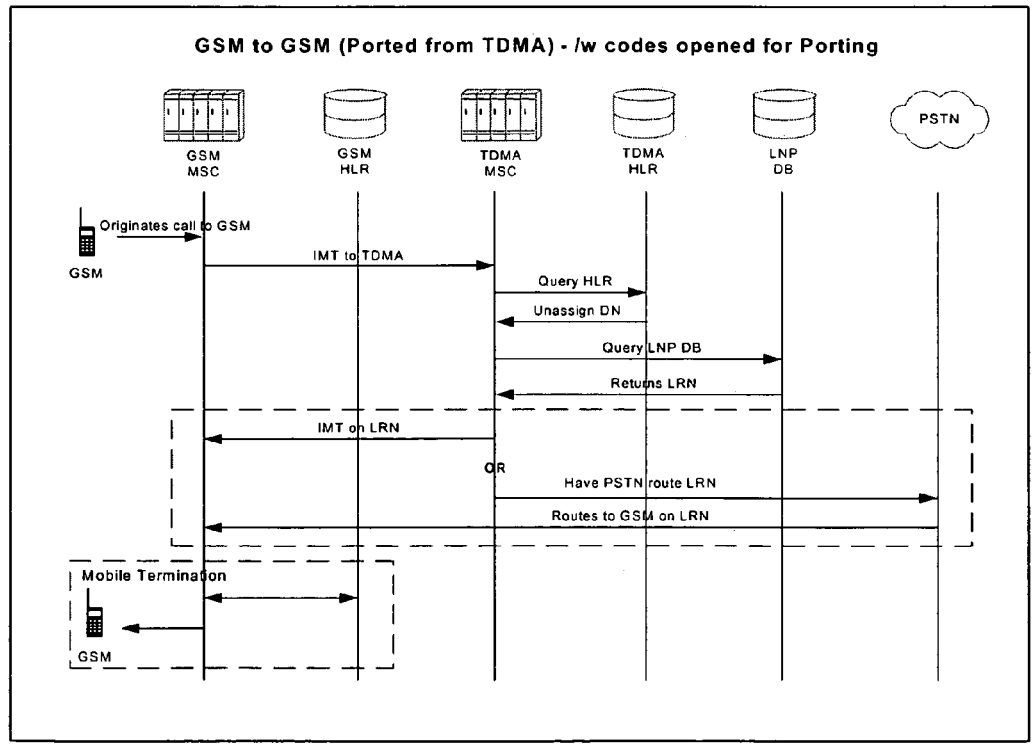
FIG. 12 shows a call being made from a GSM Mobile to a GSM Mobile (Ported from TDMA) and directed to the TDMA MSC via the IMT.

(b) FIG. 12 illustrates that if the call is directed to the TDMA via IMT (applies to cases where majority of customer within Nxx(-x) range are still TDMA customers), the TDMA MSC will launch a query the TDMA HLR. The HLR will reply with either "MIN/HLR Mismatch" or "Unassigned DN", this triggers the TDMA MSC to launch an LNP DB query. The return result from the LNP query will be the GSM LRN. The TDMA will route the call on the LRN. The call can either go back to the GSM via IMT or PSTN. Note this call flows requires two IMT circuit if the TDMA uses IMT to route the GSM LRN.

F. GSM Mobile to TDMA Mobile

Figure 13:
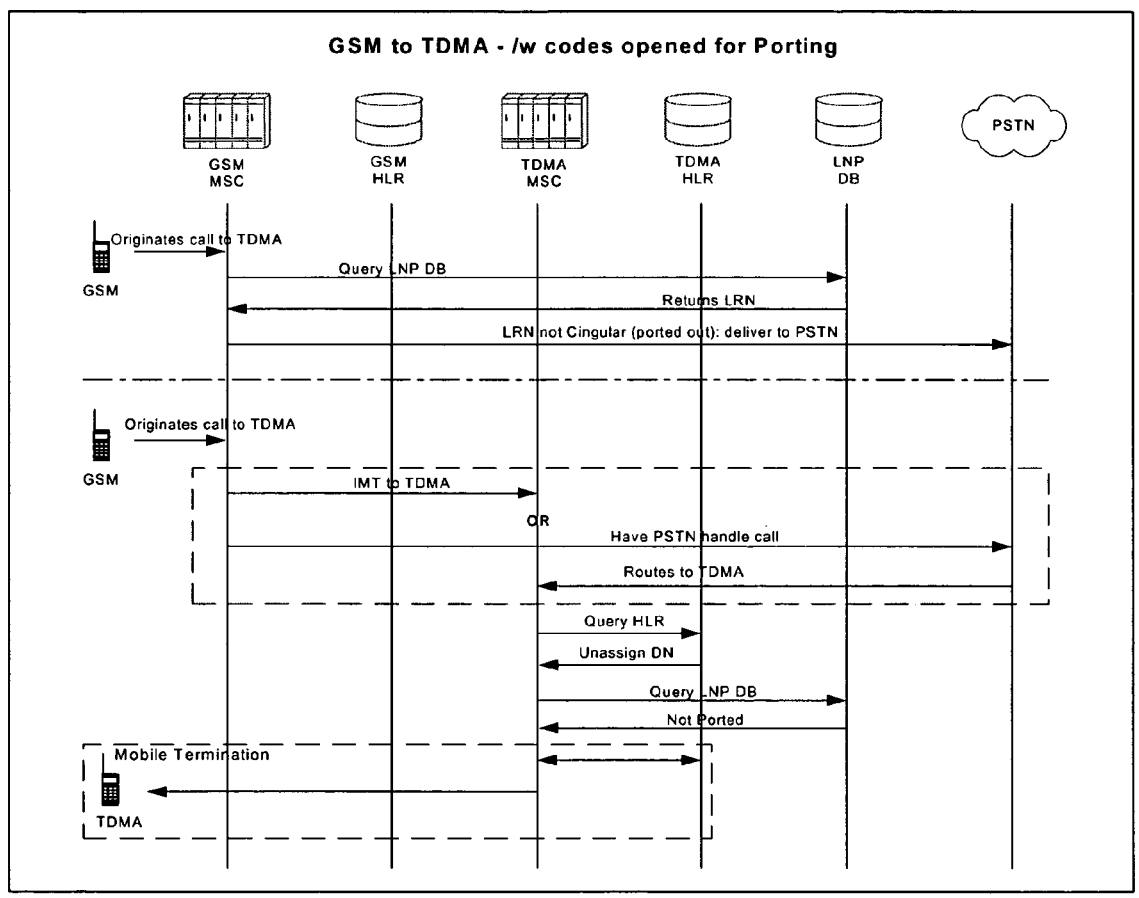
FIG. 13 illustrates a call being made from a GSM mobile to a TDMA mobile.

FIG. 13 illustrates a call being made from a GSM mobile to a TDMA mobile. The call ideally would be sent to query the LNP DB since the TDMA Nxx can be considered as the PSTN call; if the LRN is returned, and assuming the LRN is not the subscribers carrier, the GSM MSC can then direct the call to the PSTN. If the LNP DB query is not done, the call can be routed to the TDMA MSC via IMT or PSTN based on the Nxx(-x) number block.

Land to Mobile

All Carrier Codes Opened for Porting/Pooling and LEC Performs Query

G. Land to TDMA Mobile

A call is made from a land line phone to a TDMA mobile. Use of an IMT is not required.

H. Land to GSM Mobile (New Customer)

A call is made from a land line phone to a GSM mobile. The GSM mobile customer is a new customer. Use of an IMT is not required.

I. Land to GSM Mobile (Ported from TDMA)

A call is made from a land line phone to a GSM mobile. The GSM mobile subscriber has been ported from TDMA. Use of an IMT is not required. The local LEC performs the LNP query and receives the LRN. The LEC routes call on the LRN received to the GSM MSC.

Land to Mobile

All Carrier Codes Opened for Porting/Pooling & LEC does not Perform Query

J. Land to TDMA Mobile

A call is made from a land line phone to a TDMA mobile. Use of an IMT is not required.

K. Land to GSM Mobile (New Customer)

A call is made from a land line phone to a GSM mobile. The GSM mobile subscriber is a new customer. Use of an IMT is not required.

L. Land to GSM Mobile (Ported from TDMA)

A call is made from a land line phone to a GSM mobile. The GSM mobile subscriber has been ported from TDMA. Use of an IMT is not required. This exemplary scenario is similar to the "TDMA Mobile to GSM Mobile (Ported from TDMA)" illustrated above under 1C, except that call origination comes from PSTN.

Roaming

M. TDMA to a Roaming GSM Mobile (New Customer)

A call is made from a TDMA mobile to a roaming GSM mobile. The GSM mobile subscriber is a new customer. This exemplary scenario is similar to the "TDMA Mobile to GSM Mobile (New customer)" call flow illustrated above under 1B. This call flow can use IMT to route calls between the switches. The TLDN received from the serving switch can be routed to the PSTN.

N. TDMA to a Roaming GSM Mobile (Ported from TDMA)

A call is made from a TDMA mobile to a roaming GSM mobile. The GSM mobile subscriber has been ported from TDMA. This exemplary scenario is similar to the "TDMA Mobile to GSM Mobile (ported from TDMA)" call flow illustrated above under 1C. This call flow can use an IMT to route calls between the switches. The TLDN received from the serving switch of the roaming subscriber can be routed to the PSTN for call completion.

O. GSM to a Roaming GSM Mobile (New Customer)

A call is made from a GSM mobile to a roaming GSM mobile. The receiving GSM mobile subscriber is a new customer. Use of an IMT is not required if the GSM MSC is set to query the HLR first.

P. GSM to a Roaming GSM Mobile (Ported from TDMA)

A call is made from a GSM mobile to a roaming GSM mobile. The terminating GSM mobile subscriber has been ported from TDMA. Use of an IMT is not required if the GSM MSC set to query the HLR first.

Exemplary Scenario 3

According to systems and methods of this invention, the handling of GAIT mobile locked to a GSM system and registered in a TDMA HLR are described below (or TDMA GAIT in foreign GSM mode). For purposes of these examples, the following assumptions are made.

1) GSM system is operating commercially. The GSM system contains both an MSC and an HLR.

2) Both TDMA and GSM MSC will have their own designated LRN(s).

3) The GSM MSC has new NPA-Nxx number blocks and the PSTN may route calls to the NPA-Nxx.

4) IMT connectivity between TDMA and GSM MSC supports signaling system 7 (SS7).

5) GSM and TDMA technologies have own designated HLR.

6) WLNP capabilities supported by both TDMA and GSM MSC. Connectivity to the subscriber's carrier LNP DB have been established or supporting at least LNP PH1.

7) Both the TDMA MSC and the GSM MSC can support the routing of calls between MSC's using translations of the LRN and/or TLDN's.

8) All the MDN's are type 2 numbers. That is, the carrier owns the whole 10K block of numbers, and the circuits provided are SS7 signaling base capable.

These assumptions are not intended to limit the exemplary scenarios, but are merely provided as exemplary assumptions. Other similar assumptions can also be provided which are capable of similar operation in accordance with systems and methods of this invention.

Mobile to Mobile

All Carrier Codes Opened for Porting/Pooling

According to systems and methods of this invention, GSM GAIT should be defined as a TDMA GAIT mobile in foreign GSM mode. This definition should also apply throughout this section with reference to all GAIT descriptions.

A. TDMA Mobile to GSM GAIT Mobile (Homed in TDMA HLR)

Figure 14:
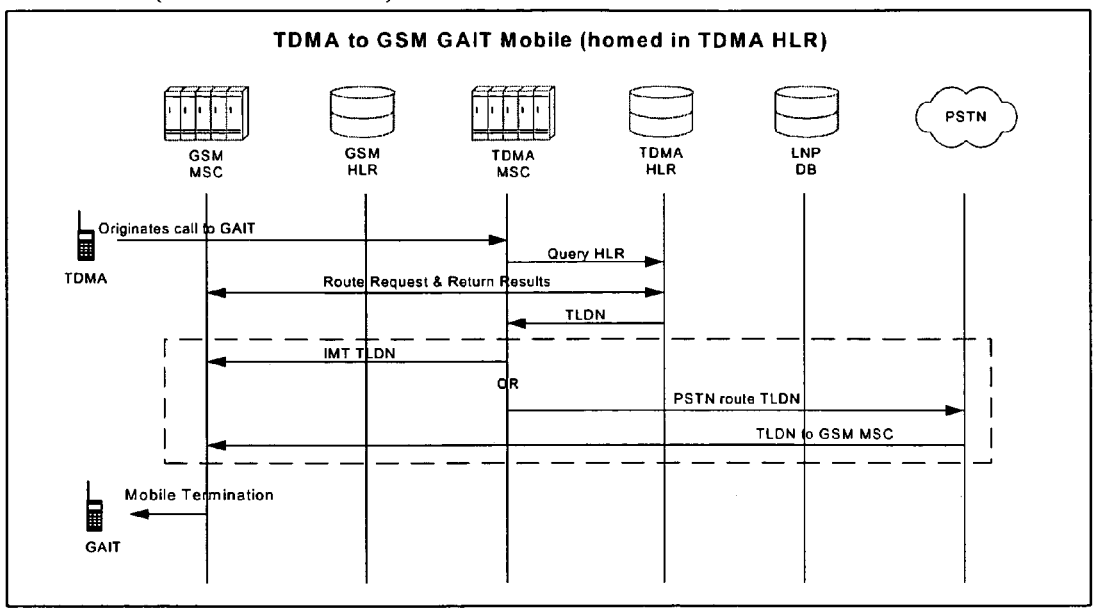
FIG. 14 illustrates a call being made from a TDMA mobile to a GSM GAIT mobile (GSM GAIT is homed in the TDMA HLR).

FIG. 14 illustrates a call being made from a TDMA mobile to a GSM GAIT mobile. The GSM GAIT is homed in the TDMA HLR. That is, the first technology that the GSM GAIT mobile searched for is TDMA. The GSM GAIT mobile subscriber is homed in the TDMA HLR. The call within the TDMA MSC queries the TDMA HLR first. If the TDMA HLR return result is either "MIN/HLR Mismatch" or "Unassigned DN", then the TDMA MSC launches an LNP DB query, otherwise the mobile is terminated if the subscriber record is found in the HLR. In the case of a GSM GAIT mobile and assuming the subscriber record is present, the return results from the TDMA HLR to the TDMA MSC would be the GSM TLDN number. The GSM TLDN number received by the TDMA MSC can be routed to the IMT or PSTN circuits to the GSM MSC for mobile termination.

B. GSM Mobile to GSM GAIT Mobile (Homed in TDMA HLR)

Figure 15:
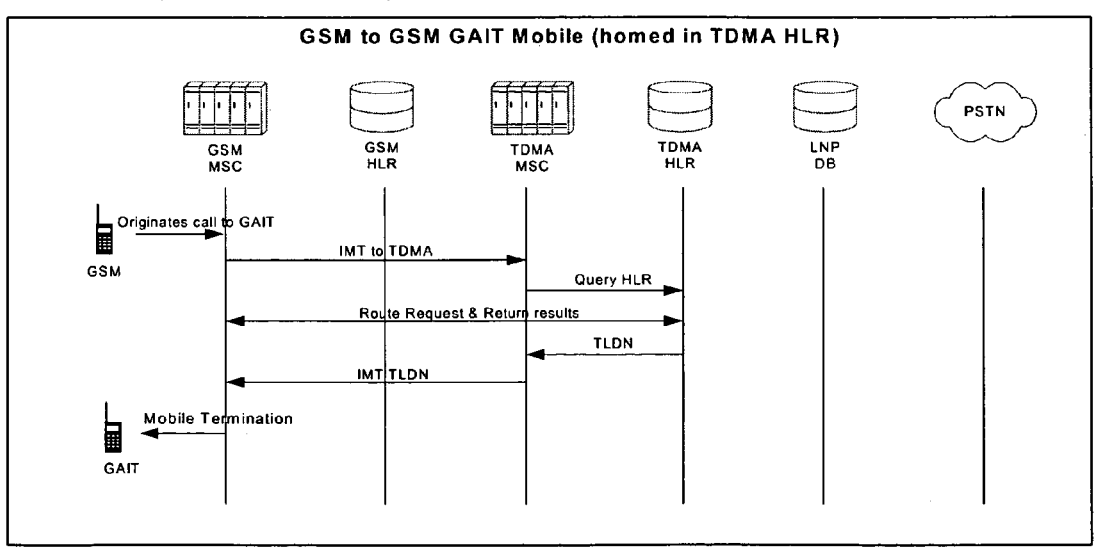
FIG. 15 illustrates a call being made from a GSM mobile to a GSM GAIT mobile (GSM GAIT mobile is homed in the TDMA HLR).

FIG. 15 illustrates a call being made from a GSM mobile to a GSM GAIT mobile. The GSM GAIT mobile is homed in the TDMA HLR. The call within the GSM system is routed to the TDMA system via IMT. The TDMA MSC queries the HLR first, if the HLR return result is either "MIN/HLR Mismatch" or "Unassigned DN", then the MSC launches an LNP DB query otherwise the mobile is terminated if the subscriber record is found in the HLR. In the case of a GSM GAIT mobile and assuming the subscriber record is present, the return results from the TDMA HLR to the TDMA MSC would be the GSM TLDN number. The GSM TLDN number received by the TDMA MSC can be routed to the IMT to the GSM MSC for mobile termination. Note that there are two circuits being used for this call scenario.

Land to Mobile

All Carrier Codes Opened for Porting/Pooling and LEC Performs Query

C. Land to GSM GAIT Mobile (Homed in TDMA HLR)

Figure 16:
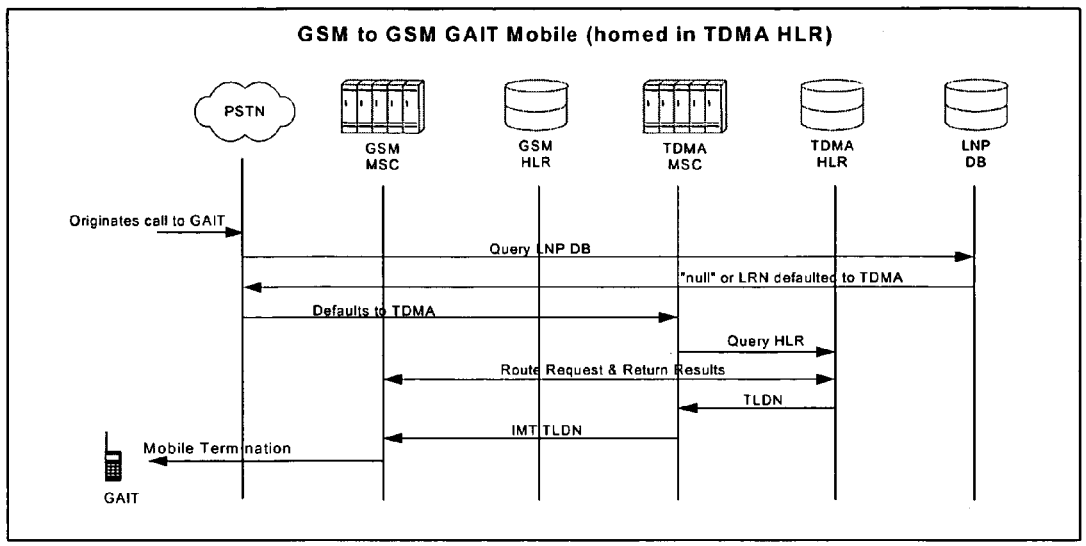
FIG. 16 illustrates a call being made from a land line phone to a GSM GAIT mobile (GSM mobile is homed in the TDMA HLR).

FIG. 16 illustrates a call being made from a land line phone to a GSM GAIT mobile. The GSM mobile is homed in the TDMA HLR. The call is queried by the LEC. The LEC receives "null" (number not ported) and default routes to the TDMA MSC. The TDMA MSC launches a query to the TDMA HLR to attempt mobile termination. The return results from the TDMA HLR to the TDMA MSC would be the GSM TLDN number. The GSM TLDN number received by the TDMA MSC can be routed to the IMT to the GSM MSC for mobile termination.

Land to Mobile

All Carrier Codes Opened for Porting/Pooling and LEC does not Perform Query

D. Land to GSM GAIT Mobile (Homed in TDMA HLR)

A call is made from a land line phone to a GSM GAIT mobile. The GSM mobile is homed in the TDMA HLR. This scenario is similar to the "TDMA Mobile to GSM GAIT Mobile (homed in TDMA HLR)" described above at 3A, except that the call origination comes to the TDMA MSC via the PSTN.

Exemplary Scenario 4

According to systems and methods of this invention, various alternatives can be implemented for the IMT, for example, for tandem type calls. The following call flow process can be performed for tandem type calls not specific to WLNP, Pooling, and Service Migration. For purposes of these examples, the following assumptions are made.

1) GSM system is operating commercially. The GSM system contains both an MSC and an HLR.

2) Both TDMA and GSM MSC will have their own designated LRN(s).

3) The GSM MSC has new NPA-Nxx number blocks and the PSTN may route calls to the NPA-Nxx.

4) IMT connectivity between TDMA and GSM MSC supports signaling system 7 (SS7).

5) GSM and TDMA technologies have own designated HLR.

6) WLNP capabilities supported by both TDMA and GSM MSC. Connectivity to the LNP DB of the subscriber's carrier have been established or supporting at least LNP PH1.

7) Both MSC's can support the routing of calls between MSC's using translations of the LRN and/or TLDN's.

8) All the MDN's are type 2 numbers. That is, the carrier owns the whole 10K block of numbers, and the circuits provided are SS7 signaling base capable.

These assumptions are not intended to limit the exemplary scenarios, but are merely provided as exemplary assumptions. Other similar assumptions can also be provided which are capable of similar operation in accordance with systems and methods of this invention.

Mobile to Land

Multi-MSC Market with Trunking to Multiple PSTN Tandem Switches

A. Mobile to Land Number not Served by Serving MSC

Figure 17:
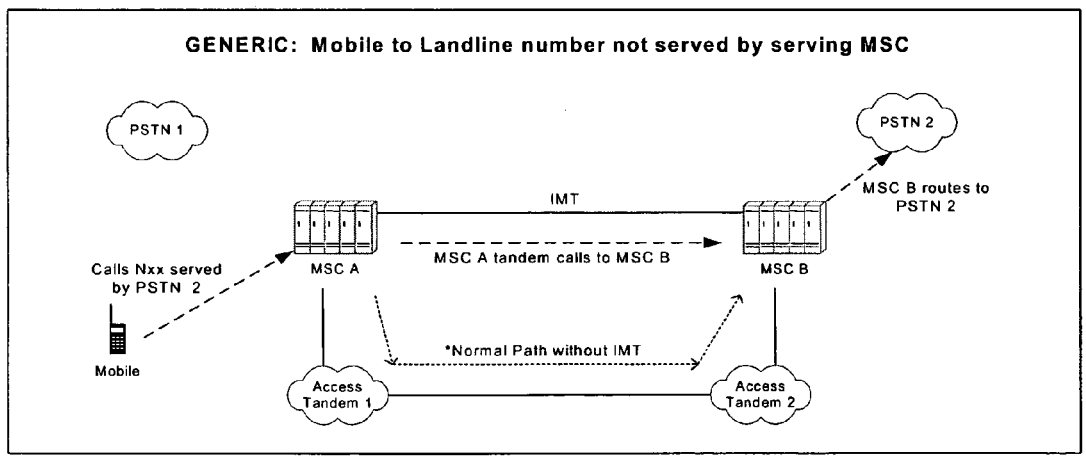
FIG. 17 illustrates a call being made from a mobile to a land line not served by the serving MSC.

FIG. 17 illustrates a call being made from a mobile to a land line not served by the serving MSC. A mobile served by MSC A calls a landline number that is in an End Office interconnected to MSC B (possibly via a LEC Access Tandem). The call is routed via IMT to MSC B and MSC B tandems the call to the correct PSTN switch for completion.

Mobile to Mobile

Multi-MSC Market with Trunking to Multiple TDMA Switches

B. Mobile to Mobile Served by MSC A Roaming in MSC B

Figure 18:
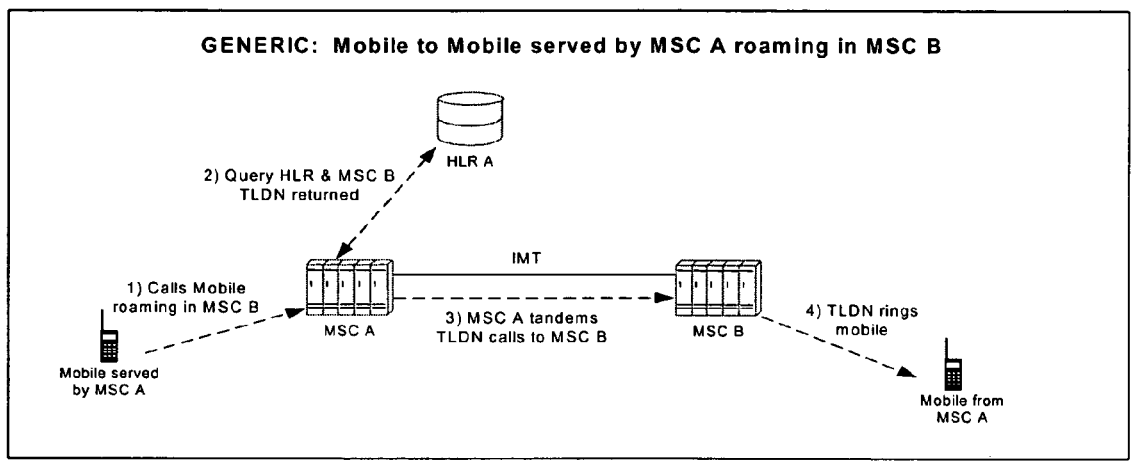
FIG. 18 illustrates a call being made from a mobile served by an MSC A to a mobile number that has a VLR in an MSC B, or an IHLR in the MSC B.

FIG. 18 illustrates a call being made from a mobile served by an MSC A to a mobile number that has a VLR in an MSC B, or an IHLR in the MSC B. In the case of a mobile roaming in the MSC B (VLR), the MSC A queries the HLR, a TLDN for the MSC B would be returned and the call routes via the IMT to the MSC B.

Figure 19:
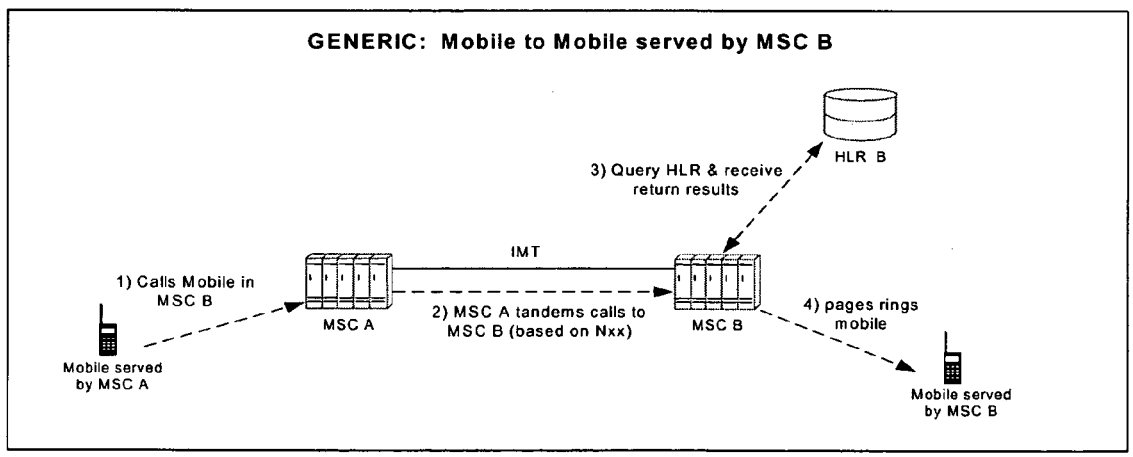
FIG. 19 illustrates a mobile with an IHLR in the MSC B.

FIG. 19 illustrates a mobile with an IHLR in the MSC B. The MSC A would route the call to the MSC B via the IMT. The MSC B would determine the mobile's location and complete the call.

It is yet another aspect according to the method described above that the first technology can be chosen from at least one of TDMA, GSM, CDMA, UMTS, GPRS and PBX.

It is also another aspect according to the method described above that the second technology is different from the first technology and can be chosen from at least one of TDMA, GSM, CDMA, UMTS, GPRS and PBX.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A Wireless number portability (WLNP) system for migrating a call flow for a mobile directory number (MDN) from a first phone to a second phone which has been intra-service ported, comprising:
    a first switch of a first technology;
    a second switch of a second technology; and
    a local number portability database (LNP) that stores local routing numbers (LRN) associated with MDN,
    wherein the WLNP system determines whether a call, from the first phone to the second phone, is received by a public switched telephone network (PSTN) or the first switch, and wherein:
    if the call is received by the PSTN with the LRN, the call is routed based on the LRN to the second switch; and
    if the call is received by the first switch without the LRN, the first switch queries the LNP for the LRN and the call is routed intra-carrier to the second switch via an inter-machine trunk (IMT), wherein the IMT includes data translation which allows for the translation of data back and forth between the first switch of the first technology and the second switch of the second technology.

2. The WLNP system recited in claim 1, wherein if the call is received by the PSTN with the LRN, the PSTN has queried the LNP for the LRN associated with the MDN of the call.

3. The WLNP system recited in claim 1, wherein if the call is received by the PSTN with the LRN, the call is routed directly from the PSTN to the second switch based on the LRN.

4. The WLNP system recited in claim 1, wherein if the call is received by the first switch without the LRN, the first switch queries the LNP and the call is routed intra-carrier from the first switch to the second switch based on the LRN queried from the LNP.

5. A method for migrating a call from a first phone to a second phone where a mobile directory number (MDN) has been intra-service ported from a first switch of a first technology to a second switch of a second technology, comprising:
    creating a profile in a local number portability database (LNP) based on the intra-service ported MDN; and
    determining whether the call is received by a public switched telephone network (PSTN) or the first switch, wherein:
    if the call is received by the PSTN with the LRN,
        routing the call based on the LRN to the second switch; and
    if the call is received by the first switch without the LRN,
        querying LNP for the LRN by the first switch, and
        routing the call intra-carrier to the second switch via an inter-machine trunk (IMT), wherein the IMT includes data translation which allows for the translation of data back and forth between the first switch of the first technology and the second switch of the second technology.

6. The method recited in claim 5, wherein in the LNP a profile is created based on the intra-service ported MDN, and in which an entry is added that applies the local routing number LRN for the second switch.

7. The method recited in claim 5, wherein if the call is received by the PSTN with the LRN, the PSTN has queried the LNP for the LRN associated with the MDN of the call, and the call is routed directly from the PSTN to the second switch based on the LRN.

8. A wireless number portability (WLNP) system comprising:
    a public switched telephone network connection (PSTN);
    a first switch of a first technology;
    a second switch of a second technology,
    wherein the WLNP system migrates a call flow from a first phone to a second phone in which a mobile directory number (MDN) has been intra-service ported from the first switch to the second switch; and
    a local number portability database (LNP) that stores local routing numbers (LRN) associated with the MDN that has been intra-service ported;
    wherein the WLNP system determines whether a call, from the first phone, is received by the PSTN or the first switch; and wherein:
    if the call is received by the PSTN with the LRN queried from the LNP, the PSTN routes the call based on the LRN to the second switch; and
    if the call is received without the LRN from the LNP, the first switch queries the LNP to obtain the LRN, and then routes the call on an inter-machine trunk (IMT)

to the second switch, wherein the IMT includes data translation which allows for the translation of data back and forth between the first switch of the first technology and the second switch of the second technology.

9. The wireless number portability (WLNP) system of claim 8, wherein the first switch of a first technology communicates with a first home location register (HLR) of the first technology.

10. The wireless number portability (WLNP) system of claim 8, wherein the second switch of a second technology communicates with a second home location register (HLR) of the second technology.

11. The wireless number portability (WLNP) system of claim 8, wherein the first technology and the second technology can be chosen from at least one of the following technologies: TDMA; GSM; CDMA; UMTS; GPRS and PBX.

* * * * *